(12) United States Patent
Wachi

(10) Patent No.: US 11,095,817 B2
(45) Date of Patent: Aug. 17, 2021

(54) APPARATUS AND METHOD FOR IMAGE PROCESSING AND STORAGE MEDIUM FOR PROCESSING CAPTURED IMAGES

(71) Applicant: CANON KABUSHIKI KAISHA, Tokyo (JP)

(72) Inventor: Fumihito Wachi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/810,722

(22) Filed: Mar. 5, 2020

(65) Prior Publication Data

US 2020/0296290 A1 Sep. 17, 2020

(30) Foreign Application Priority Data

Mar. 15, 2019 (JP) .............................. JP2019-048344

(51) Int. Cl.
*H04N 5/232* (2006.01)

(52) U.S. Cl.
CPC ..... *H04N 5/23267* (2013.01); *H04N 5/23287* (2013.01)

(58) Field of Classification Search
None
See application file for complete search history.

(56) References Cited

U.S. PATENT DOCUMENTS

| 10,735,655 | B2* | 8/2020 | Wachi | H04N 5/23209 |
|---|---|---|---|---|
| 2010/0053346 | A1* | 3/2010 | Mitsunaga | H04N 5/235 |
| | | | | 348/208.6 |
| 2010/0271496 | A1* | 10/2010 | Obu | H04N 5/2328 |
| | | | | 348/208.4 |
| 2013/0038749 | A1* | 2/2013 | Hatakeyama | H04N 5/217 |
| | | | | 348/222.1 |
| 2014/0002679 | A1* | 1/2014 | Ikeda | H04N 5/23264 |
| | | | | 348/208.5 |
| 2016/0094767 | A1* | 3/2016 | Yamamoto | H04N 9/07 |
| | | | | 348/208.7 |
| 2016/0343111 | A1* | 11/2016 | Oniki | G06T 5/20 |
| 2017/0019599 | A1* | 1/2017 | Muramatsu | H04N 9/04557 |

FOREIGN PATENT DOCUMENTS

JP 2010-78941 A 4/2010

\* cited by examiner

*Primary Examiner* — Cynthia Segura
(74) *Attorney, Agent, or Firm* — Canon U.S.A., Inc. IP Division

(57) ABSTRACT

An image processing apparatus selects filter information for image stabilization processing used in image capturing from a storage medium storing a plurality of pieces of filter information for a plurality of types of image stabilization processing, performs a predetermined operation based on the selected filter information to create a correction filter for use in correcting a captured image, and corrects the captured image using the created correction filter.

9 Claims, 8 Drawing Sheets

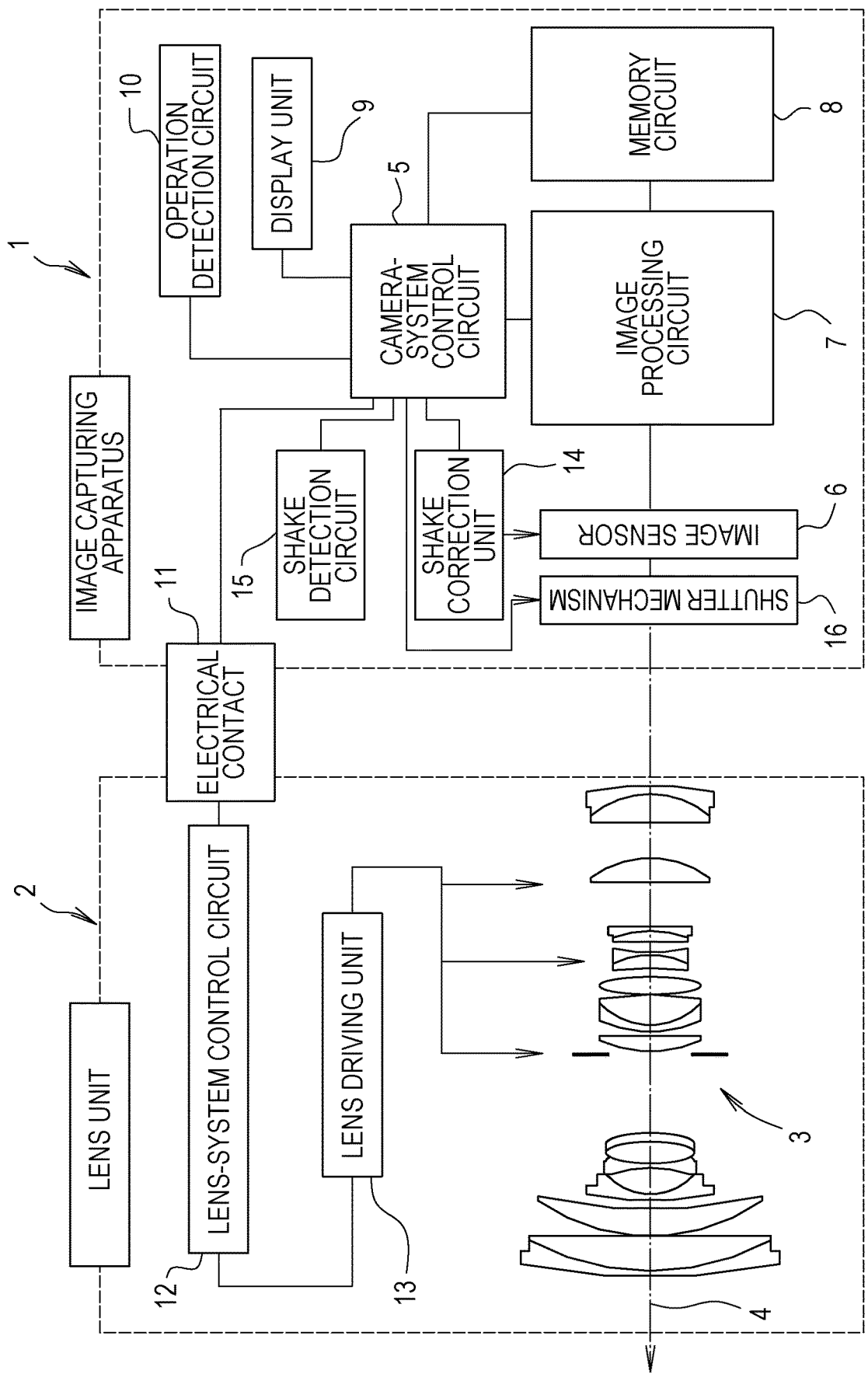

APPARATUS AND METHOD FOR IMAGE PROCESSING AND STORAGE MEDIUM FOR PROCESSING CAPTURED IMAGES

BACKGROUND

Field

The present disclosure relates to an image processing technique for processing captured images.

Description of the Related Art

During shooting using an image capturing apparatus, hand shake or the shake of the image capturing apparatus main body can reduce the resolution and the clarity of the captured image due to an image blur phenomenon in which an object image or the like blurs on the imaging plane. Known examples of a technique for reducing or eliminating such an image blur phenomenon include optical image stabilization and electronic image stabilization. A known configuration for optical image stabilization is a configuration that reduces an image blur by inhibiting an object image or the like from moving on the imaging plane by moving an image stabilizing lens group constituting the whole or part of the imaging optical system in a direction perpendicular to the optical axis of the imaging optical system according to the shake of the image capturing apparatus. Another configuration for optical image stabilization is a configuration that reduces the relative movement of an object image or the like with respect to the imaging plane by shifting the image sensor in the direction perpendicular to the optical axis of the imaging optical system or rolling the image sensor about the optical axis according to the shake of the image capturing apparatus. For electronic image stabilization, an image blur is apparently corrected by changing the cutting range of the captured image according to the shake of the image capturing apparatus main body or the like. In the related art, only one of the image stabilization processes has been performed. However, a technique for achieving high-accuracy image stabilization to provide a higher image stabilization effect by executing a plurality of image stabilization processes at the same time has been proposed in recent years.

For example, Japanese Patent Laid-Open No. 2010-78941 discloses a method for performing image stabilization processing by moving part of an imaging optical system in a direction different from the direction of the optical axis. Japanese Patent Laid-Open No. 2010-78941 also discloses a method for preventing the image stabilizing lens group of an optical system from moving to the maximum moving amount when the shake of the image stabilizing lens group exceeds the maximum moving amount or when the shake of the image sensor in image stabilization exceeds the maximum moving amount.

Another element that degrades the captured image, other than the image blur caused by hand shake or the like, is diffraction due to the aberration, the aperture, and so on of the lens. For example, the degradation of the captured image due to the aberration and so on can be corrected by preparing information on the optical characteristics of the imaging optical system, such as the aberration, and performing image processing based on the information. However, optical image stabilization causes changes in aberration and so on, which requires image processing that takes account for the changes in aberration and so on caused by the optical image stabilization. This needs to prepare and store information that can cope with various changes in aberration and so on according to optical image stabilization. Therefore, in image processing for correcting image degradation, information that can cope with all changes in aberration and so on that can occur in optical image stabilization is read. This increases the time taken to read and transfer all the information for image processing, resulting in a decrease in system efficiency.

SUMMARY

An image processing apparatus according to an aspect of the present disclosure includes at least one processor and/or at least one circuit which functions as a control unit configured to select filter information for image stabilization processing used in image capturing from a storage medium storing a plurality of pieces of filter information for a plurality of types of image stabilization processing and to perform a predetermined operation based on the selected filter information to create a correction filter for use in correcting a captured image and a correction unit configured to correct the captured image using the created correction filter.

Further features of the present disclosure will become apparent from the following description of exemplary embodiments with reference to the attached drawings.

BRIEF DESCRIPTION OF THE DRAWINGS

FIG. 1B is a block diagram illustrating the electrical configuration of the image capturing apparatus.

DESCRIPTION OF THE EMBODIMENTS

An embodiment of the present disclosure will be described in detail hereinbelow with reference to the drawings. First, the detailed configuration and operation of an image capturing apparatus, which is an application example of an image processing apparatus according the present embodiment, will be described.

The image capturing apparatus of the present embodiment has a configuration in which a plurality of types of image stabilization processing can be executed to reduce an image blur due to hand shake or the shake of the image capturing apparatus main body. The present embodiment uses an example in which two or more of a plurality of types of image stabilization processing are performed at the same time to achieve image stabilization with high accuracy and to provide high image stabilizing effect. In the present embodiment, examples of the two or more types of image stabilization processing include image stabilization processing of moving the entire imaging optical system or the image stabilizing lens group in the direction perpendicular to the optical axis of the imaging optical system and image stabilization processing of moving the image sensor. The image stabilization processing of moving the image sensor is capable of shift for moving the image sensor in the direction perpendicular to the optical axis of the imaging optical system, tilt for moving the image sensor at an angle with respect to the optical axis, and roll for rotating the image sensor about the optical axis. In the following description, the optical image stabilization performed by moving the image stabilizing lens group is referred to as lens stabilization, and the optical image stabilization performed by, for example, shifting, tilting, and rolling the image sensor, is referred to as imager stabilization. In the present embodiment, the shake of the image capturing apparatus or the like is detected by a shake detecting sensor, such as an angular velocity sensor and a vibration gyroscope, provided in the image capturing apparatus. The image capturing apparatus reduces an image blur by performing image stabilization processing using lens stabilization and imager stabilization based on a shake detection signal output from the shake detecting sensor.

Figure 1A:
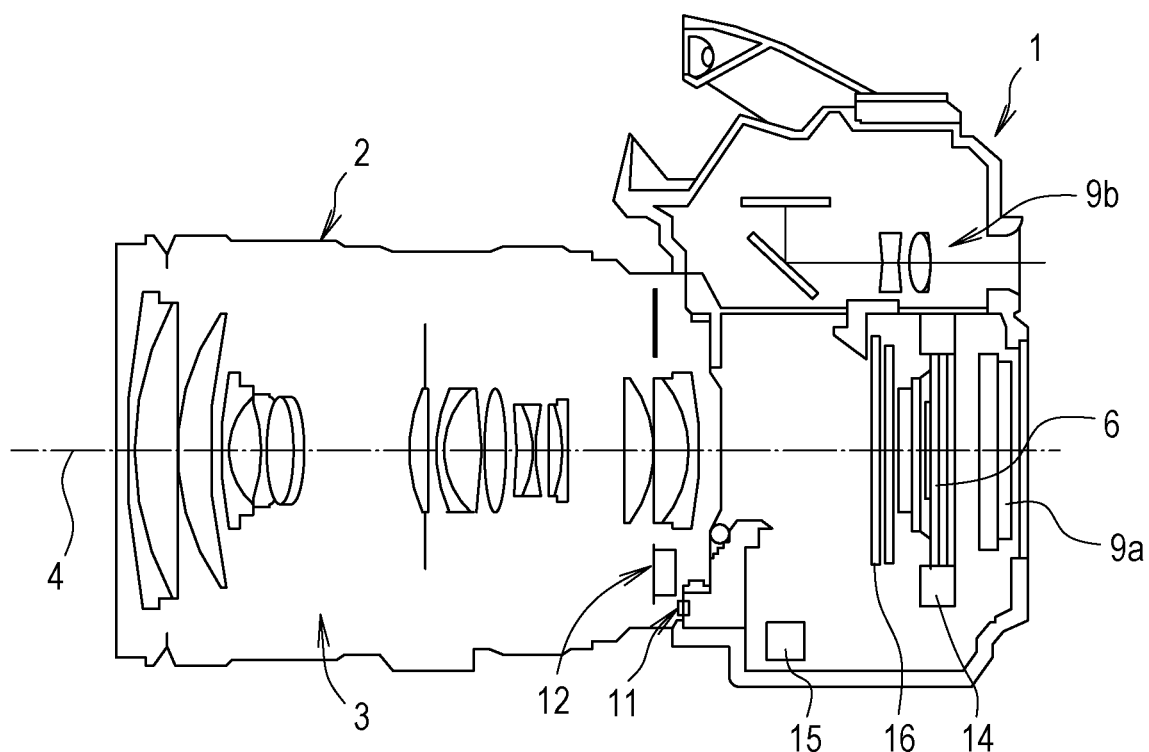
FIG. 1A is a central cross-sectional view of an image capturing apparatus according to an embodiment of the present disclosure.

FIG. 1A is a central cross-sectional view of an image capturing apparatus 1 of the present embodiment, and FIG. 1B is a block diagram illustrating the electrical configuration of the image capturing apparatus 1 of the present embodiment. The same reference signs in FIG. 1A and FIG. 1B correspond to each other.

In FIGS. 1A and 1B, a lens unit 2 is a what-is-called interchangeable lens and is detachable from the image capturing apparatus 1 via a lens mount unit (not illustrated) provided on the casing of the image capturing apparatus 1. FIGS. 1A and 1B illustrate a state in which the lens unit 2 is mounted to the image capturing apparatus 1, in which the image capturing apparatus 1 and the lens unit 2 are electrically connected by an electrical contact 11. The lens unit 2 includes an imaging optical system 3 including a plurality of lenses. Some of the lenses constitute an image stabilizing lens group. The dashed chain lines in the drawings represent the optical axis 4 of the imaging optical system 3. The lens unit 2 further includes a lens driving unit 13 that drives the image stabilizing lens group, a focus lens, a diaphragm, and so on and a lens-system control circuit 12 that controls the lens driving unit 13. The lens driving unit 13 includes driving mechanisms for the image stabilizing lens group, the focus lens, and the diaphragm, and driving circuits for the driving mechanisms. The lens-system control circuit 12 is a processor, such as a central processing unit (CPU) or a microprocessor unit (MPU), and is electrically connected to the camera-system control circuit 5 of the image capturing apparatus 1 via the electrical contact 11. In the present embodiment, the imaging optical system 3 is disposed in the lens unit 2, which is a detachable interchangeable lens. This is given merely for illustrative purposes. The imaging optical system 3 may be integrated with the image capturing apparatus 1.

The image capturing apparatus 1 includes a camera-system control circuit 5, an image sensor 6, an image processing circuit 7, a memory circuit 8, a display unit 9, an operation detection circuit 10, a shutter mechanism 16, a shake detection circuit 15, and a shake correction unit 14.

The electrical contact 11 includes a contact on the image capturing apparatus 1 and a contact on the lens unit 2. The camera-system control circuit 5 controls the individual components in the image capturing apparatus 1 and exchanges various pieces of information with the lens-system control circuit 12 of the lens unit 2 connected via the electrical contact 11.

The shake detection circuit 15 includes shake detecting sensors capable of detecting shakes of the image capturing apparatus 1 in the pitch direction, the yaw direction, and the direction of roll about the optical axis 4. These shake detecting sensors include an angular velocity sensor and a vibration gyroscope. Shake detection signals output from the shake detection circuit 15 are sent to the camera-system control circuit 5. The shake correction unit 14 includes a driving mechanism that enables the image sensor 6 of the image capturing apparatus 1 to shift in a plane perpendicular to the optical axis 4 of the imaging optical system 3, to tilt relative to the optical axis, and to roll about the optical axis 4, as well as a driving circuit for the driving mechanism. The camera-system control circuit 5 is a processor, such as a CPU and an MPU. When imager stabilization is set active, the camera-system control circuit 5 generates a target value of shake correction based on the shake detection signal, generates a shake-correction control signal based on the target value, and sends the shake-correction control signal to the shake correction unit 14. The driving circuit for the shake correction unit 14 generates a drive signal for, for example, shifting, tilting, and rolling the image sensor 6 based on the shake-correction control signal to operate the driving mechanism. This causes the image sensor 6 to, for example, shift, tilt, and roll in a direction in which the shake detected by the shake detection circuit 15 is corrected, so that imager stabilization processing is achieved. The details of the configuration of the driving mechanism of the shake correction unit 14 and control of imager stabilization will be described later.

When the lens stabilization is set active, the camera-system control circuit 5 generates a target value of shake correction with the image stabilizing lens group of the lens unit 2 based on a shake detection signal from the shake detection circuit 15. The camera-system control circuit 5 generates a control signal for shifting the image stabilizing lens group in the direction perpendicular to the optical axis 4 based on the target value. The control signal for shifting the image stabilizing lens group in the direction perpendicular to the optical axis 4 is sent to the lens-system control circuit 12 via the electrical contact 11. The lens-system control circuit 12 generates a driving control signal for driving the lens driving unit 13 based on the control signal sent from the camera-system control circuit 5. The lens driving unit 13 drives the image stabilizing lens group based on the driving control signal from the lens-system control circuit 12. Thus, the image stabilizing lens group of the lens unit 2 is shifted in a direction in which the shake detected by the shake detection circuit 15 is corrected, so that lens stabilization processing is performed. The details of driving control of the image stabilizing lens group will be described later.

In the case where both of lens stabilization and imager stabilization are performed at the same time, the target value of shake correction in which the image sensor 6 is moved, and the target value of shake correction in which the image stabilizing lens group is shifted are set so that image stabilization is achieved by both of the shake correcting operations. Therefore, in the case where both of lens stabilization and imager stabilization are performed at the same time, performing the shift of the image stabilizing lens group and the shift, tilt, roll, and the like of the image sensor 6 based on the target values allows highly effective, high-accuracy image stabilization processing.

The camera-system control circuit 5 obtains a focusing evaluation value for use in focus control and an exposure evaluation value for use in exposure control on the basis of the image capture signal. The camera-system control circuit 5 sends an instruction for focus control to the lens-system control circuit 12 on the basis of the focusing evaluation value. The lens-system control circuit 12 sends a focus lens driving control signal to the lens driving unit 13 on the basis of the instruction for focus control. The lens driving unit 13 drives the focus lens on the basis of the focus lens driving control signal, and thus focusing of the object or the like is performed. The camera-system control circuit 5 sends an instruction for diaphragm control to the lens-system control circuit 12 and sends a shutter-speed control signal to the shutter mechanism 16 on the basis of the exposure evaluation value. The lens-system control circuit 12 sends a diaphragm-driving control signal to the lens driving unit 13 in response to the diaphragm control instruction. The lens driving unit 13 controls the diaphragm in response to the diaphragm-driving control signal. The opening/closing operation of the shutter mechanism 16 is controlled in response to the shutter-speed control signal. More specifically, the shutter mechanism 16 moves a shutter curtain so that an object image reaches the image sensor 6. The shutter mechanism 16 includes at least a curtain (a mechanical rear curtain) for blocking the object image. Exposure is completed by the shutter mechanism 16. The image sensor 6 includes a mode (an electronic front curtain mode) for controlling the timing of starting exposure by resetting the charge for each line prior to the running of the rear curtain performed by the shutter mechanism 16. In the electronic front curtain mode, exposure is controlled by synchronously resetting the charge of the image sensor 6 (the electronic front curtain mode) and driving the rear curtain of the shutter mechanism 16. Thus, the image sensor 6 captures an image of the target object at an appropriate exposure amount. As described above, the camera-system control circuit 5 performs photometric and ranging operation based on the signal from the image sensor 6 to perform focusing and determine exposure conditions (F-number, shutter speed, and so on).

The image processing circuit 7 is an operation circuit including a plurality of arithmetic and logic units (ALUs). The image processing circuit 7 further has a configuration for general image processing, such as an analog-to-digital (A/D) converter, a white-balance adjusting circuit, a gamma correction circuit, and an interpolation operation circuit, and also a configuration for correction processing (referred to as image restoration processing) using a correction filter (to be described later). Instead of the image processing circuit 7, the camera-system control circuit 5 may execute the programs stored in the memory circuit 8 to process those functions on software. The details of the correction processing (image restoration processing) performed by the image processing circuit 7 will be described later. The interpolation operation circuit includes a color interpolation circuit. The color interpolation circuit performs color interpolation (demosaicking) processing on an RGB signal corresponding to the Bayer array color filter of the image sensor 6 to generates a color image signal. The image processing circuit 7 also compresses images, moving images, and sound using a predetermined method. The image processing circuit 7 performs such image processing on the image capture signal sent from the image sensor 6 to create image data to be stored.

The memory circuit 8 includes internal memories, such as a read-only memory (ROM) and a random access memory (RAM), and a detachable external memory, such as a semiconductor memory. The ROM of the internal memory stores programs according to the present embodiment, a point spread function (PSF) information (to be described later), and various kinds of setting data. The RAM stores programs read and expanded from the ROM and various kinds of data being processed. In some embodiments, the programs are not only stored in the ROM in advance, for example, but may be read from a detachable semiconductor memory (an external memory) or may be downloaded via a network, such as the Internet (not illustrated). The external memory stores, for example, image data to be stored after being processed by the image processing circuit 7.

The display unit 9 includes a back display unit 9a and an electronic viewfinder (EVF) 9b. The display unit 9 displays images, a user interface screen, and so on under the control of the camera-system control circuit 5.

The operation detection circuit 10 detects user operations on a power switch, a release button, a menu button, and other various switches and buttons provided to the image capturing apparatus 1. The back display unit 9a of the display unit 9 includes a touch panel. The operation detection circuit 10 also detects user operations on the touch panel. The operation detection circuit 10 sends the operation detection signals to the camera-system control circuit 5.

The camera-system control circuit 5 controls the components related to image capturing, as described above, the image processing circuit 7, recording and play back, the display of the display unit 9, and so on according to user operations detected by the operation detection circuit 10. In addition to such control, the camera-system control circuit 5 generates and outputs timing signals for image capturing. For example, upon receiving a detection signal of a user's pressing operation on the release button from the operation detection circuit 10, the camera-system control circuit 5 generates various timing signals related to image capturing to control the driving of the image sensor 6 and the operation of the image processing circuit 7. Thus, the image capturing apparatus 1 of the present embodiment is configured such to capture still images and moving images by controlling the operation of the components of the image capturing apparatus 1 using the camera-system control circuit 5 according to user operations detected by the operation detection circuit 10.

Figure 2:
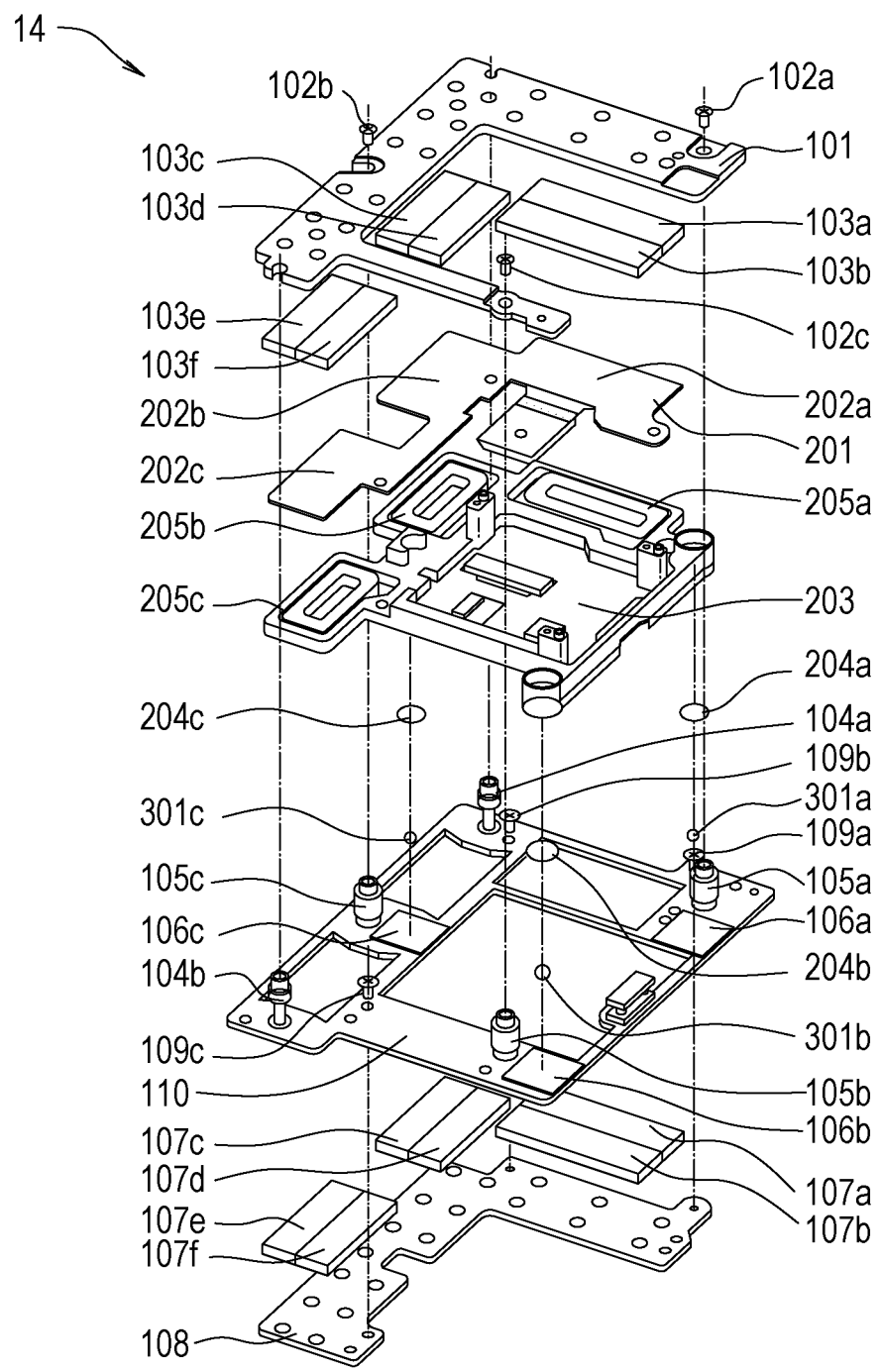
FIG. 2 is an exploded perspective view of a shake correction unit.

Referring next to FIG. 2, the detailed configuration and operation of the driving mechanism of the shake correction unit 14 of the image capturing apparatus 1 according to the present embodiment will be described. FIG. 2 is an exploded perspective view of the driving mechanism of the shake correction unit 14 for moving the image sensor 6 to reduce a blur. Although the shake correction unit 14 includes an electric driving circuit (not illustrated) that operates the driving mechanism in FIG. 2 in response to a control signal from the camera-system control circuit 5, only a mechanical mechanism is illustrated in FIG. 2.

In FIG. 2, the dashed chain lines are parallel to the optical axis 4 of the imaging optical system 3 of the lens unit 2. In FIG. 2, the members denoted by reference numbers in the hundreds are stationary members (members fixed to the casing or the like of the image capturing apparatus 1), and the members denoted by reference numbers in the two hundreds are moving members (movable members that are not fixed to the casing or the like of the image capturing apparatus 1). The members denoted by reference numbers in the three hundreds are balls held by a fixing member and a movable member.

The main components of the fixing unit of the shake correction unit 14 illustrated in FIG. 2 are an upper yoke 101, upper magnets 103a to 103f, fixing-unit rolling plates 106a to 106c, lower magnets 107a to 107f, a lower yoke 108, and a base plate 110. The fixing unit further includes auxiliary spacers 104a and 104b, main spacers 105a to 105c, and screws 102a to 102c and 109a to 109c. The main components of the movable unit of the shake correction unit 14 are a flexible printed circuit (FPC) 201, movable-unit rolling plates 204a to 204c, coils 205a to 205c, a movable frame 203, and balls 301a to 301c. The FPC 201 has position-detection-element mounting positions 202a to 202c, to which position detection elements are mounted.

The upper yoke 101, the upper magnets 103a to 103f, the lower magnets 107a to 107f, and the lower yoke 108 constitute a magnetic circuit to form what is called a closed magnetic path. The upper magnets 103a to 103f are bonded to the upper yoke 101. Similarly, the lower magnets 107a to 107f are bonded to the lower yoke 108. The upper magnets 103a to 103f and the lower magnets 107a to 107f are individually polarized along the optical axis (the vertical direction in FIG. 2), and adjacent magnets (in the positional relationship between the magnets 103a and 103b) are polarized in different directions. Opposing magnets (in the positional relationship between the magnets 103a and 107a) are polarized in the same direction. This causes a strong magnetic flux density along the optical axis between the upper yoke 101 and the lower yoke 108.

Since a strong attractive force is generated between the upper yoke 101 and the lower yoke 108, an appropriate interval is provided between the upper yoke 101 and the lower yoke 108 using the main spacers 105a to 105c and the auxiliary spacer 104a and 104b. The appropriate interval provides a space for the coils 205a to 205c and the FPC 201 and an appropriate space between the upper magnets 103a to 103f and the lower magnets 107a to 107f. The main spacers 105a to 105c each have a screw hole, so that the upper yoke 101 is fixed to the main spacers 105a to 105c with the screws 102a to 102c.

Rubber is disposed on the bodies of the main spacers 105a to 105c to form mechanical ends (that is, stoppers) of the moving unit.

The base plate 110 has holes so as to let out the lower magnets 107a to 107f so that the surfaces of the lower magnets 107a to 107f protrude from the holes. In other words, the base plate 110 and the lower yoke 108 are fixed together using the screws 109a to 109c, and the lower magnets 107a to 107f with a thickness larger than the thickness of the base plate 110 protrude from the base plate 110.

A movable frame 203 is formed from die cast magnesium or die cast aluminum and has light weight and high rigidity. The components of the movable unit are fixed to the movable frame 203 to form the movable unit. The position detection elements are mounted to a surface of the FPC 201, which is not viewed in FIG. 2, at the position-detection-element mounting positions 202a to 202c. For example, Hall elements are disposed to allow detecting the positions using the magnetic circuit described above. Since Hall elements are small, the Hall elements are rested inside the coils 205a to 205c.

The movable frame 203 connects to the image sensor 6 (not illustrated in FIG. 2), the coils 205a to 205c, and the Hall elements. The movable frame 203 performs electrical exchange with the outside via connectors.

The fixing-unit rolling plates 106a to 106c are bonded to the base plate 110, and the movable-unit rolling plates 204a to 204c are bonded to the movable frame 203 to form rolling surfaces of the balls 301a to 301c. Separately providing the rolling plates 106a to 106c and 204a to 204c facilitates providing desired surface roughness and hardness.

The driving mechanism of the shake correction unit 14 illustrated in FIG. 2 generates a force according to Fleming's left-hand rule by letting a current to flow through the coils 205a to 205c to allow the movable unit to move. The shake correction unit 14 is capable of feedback control by using the signals from the Hall elements, which are the position detection elements described above. The shake correction unit 14 can also perform shifting of translating the image sensor 6 in a plane perpendicular to the optical axis 4, tilting of the image sensor 6 relative to the optical axis 4, and rolling of the image sensor 9 about the optical axis 4 by appropriately controlling the values of the signals from the Hall elements.

Since in the present embodiment the rolling about the optical axis 4 is important in shake correction using imager stabilization, as will be described later, the rolling about the optical axis 4 will be described. The driving mechanism of the shake correction unit 14 can generate approximate rotational motion about the optical axis 4 by driving the Hall elements at the positions 202b and 202c in opposite phases while keeping the signal from the Hall element at the position 202a constant.

In the image capturing apparatus 1 of the present embodiment, the camera-system control circuit 5 implements imager stabilization by controlling the shake correction unit 14 and implements lens stabilization by controlling the image stabilizing lens group of the lens unit 2 on the basis of the shake detection signal from the shake detection circuit 15. In the shake correction using imager stabilization, the image sensor 6 is rolled about the optical axis 4.

Figure 3:
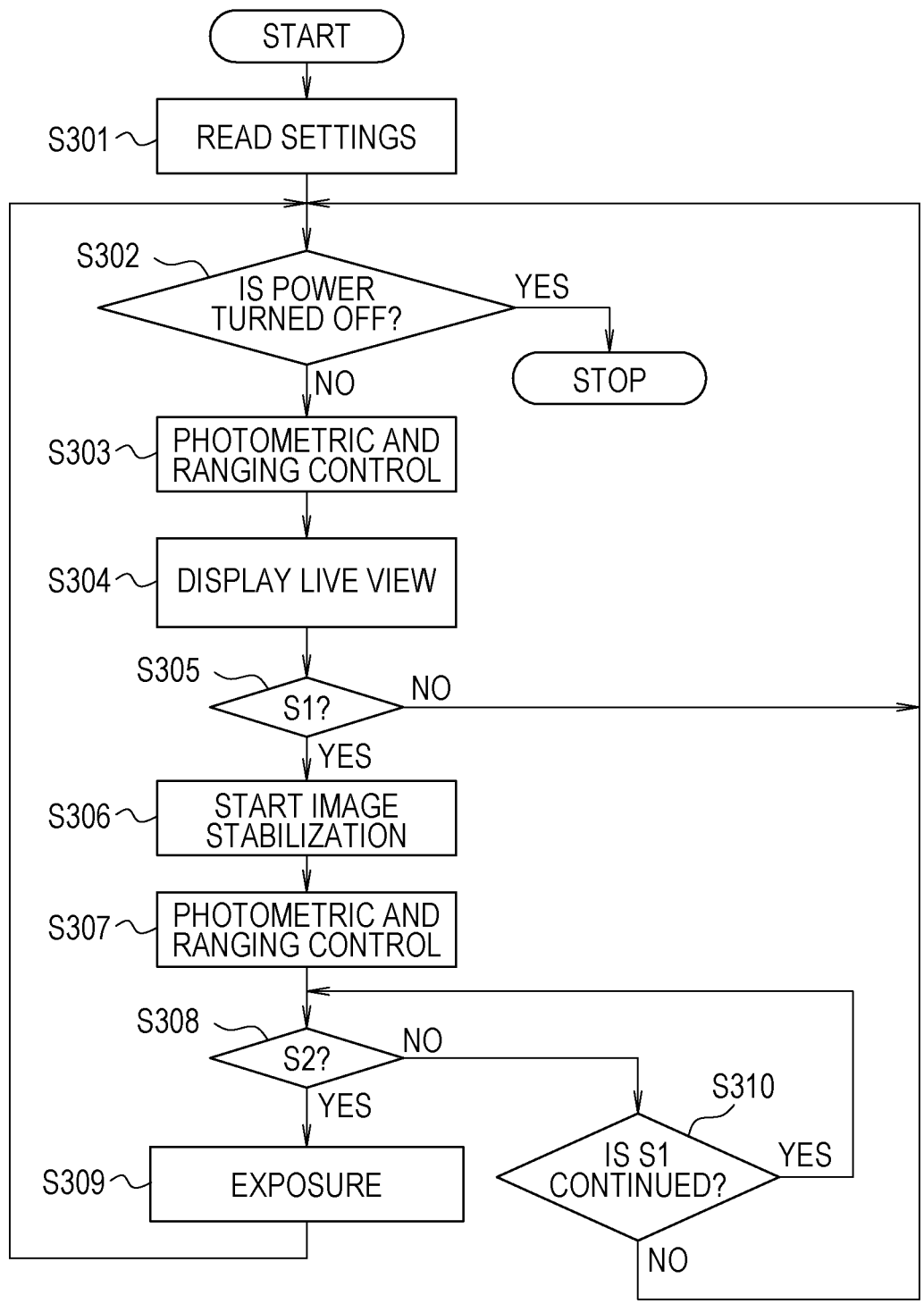
FIG. 3 is a flowchart illustrating a processing procedure of image capturing performed by the image capturing apparatus.

FIG. 3 is a flowchart illustrating a sequence of operations from power-on until image capturing is performed by the image capturing apparatus 1 of the present embodiment. Referring to FIG. 3, the operations from power-on until image capturing is performed by the image capturing apparatus 1 will be described in sequence. The processing in the flowchart of FIG. 3 may be performed using either of hardware configuration and software configuration, or partly performed using software configuration, and the remaining part using hardware configuration. For example, in the case where the memory circuit 8 includes a RAM and a ROM, programs stored in the ROM are expanded into the RAM, and the camera-system control circuit 5, which is a CPU, executes the programs to implement the processing of the flowchart in FIG. 3. This also applies to other flowcharts described later.

When a power-on operation is detected by the operation detection circuit 10, the camera-system control circuit 5 starts the control illustrated in the operation flowchart in FIG. 3.

Next at step S301, the camera-system control circuit 5 reads shooting conditions set by the user or shooting conditions stored in the memory circuit 8 in advance. Examples of the settings of the shooting conditions read at step S301 include a setting indicating whether to use the electronic front curtain and a setting indicating whether to assign aperture priority and shutter speed priority.

Next at step S302, the camera-system control circuit 5 determines whether the user turns off the power, and if the camera-system control circuit 5 determines that the power is turned off, the processing of the flowchart in FIG. 3 ends. If at step S302 the camera-system control circuit 5 determines that the power is not turned off, the camera-system control circuit 5 advances the processing to step S303. Although steps S302, S305, and S308 corresponding to user operations are in general interrupt processing, the steps are described as a processing procedure in FIG. 3.

At step S303, the camera-system control circuit 5 performs photometric and ranging control at live view display on the basis of an image capture signal sent from the image sensor 6 via the image processing circuit 7. Thus, the focal position and exposure conditions when capturing a live view image are determined.

Next at step S304 the camera-system control circuit 5 sends data on an image captured by the image sensor 6 and processed by the image processing circuit 7 under the photometric and ranging conditions for live view display to the display unit 9 to display the image in live view. In the live view display, the image is displayed on the back display unit 9*a* or the EVF 9*b* of the display unit 9.

Next at step S305, the camera-system control circuit 5 determines whether an S1 operation by the user is detected by the operation detection circuit 10. If the S1 operation is not detected, the camera-system control circuit 5 returns the processing to step S301. If the S1 operation is detected, the processing is advanced to step S306. The S1 operation is a release-button half-depression operation by the user.

At step S306, the camera-system control circuit 5 starts control for the image stabilization processing for lens stabilization and imager stabilization (image stabilization control), described above.

Next at step S307, the camera-system control circuit 5 performs photometric and ranging control based on the image capture signal sent from the image sensor 6 via the image processing circuit 7 after the S1 operation. At that time, the camera-system control circuit 5 determines an f number and a shutter speed (Tv value) on the basis of the image capture signal sent from the image sensor 6 via the image processing circuit 7.

Next at step S308, the camera-system control circuit 5 determines whether an S2 operation by the user is detected by the operation detection circuit 10. If the camera-system control circuit 5 determines that the S2 operation is detected, the processing is advanced to step S309. If the camera-system control circuit 5 determines that the S2 operation is not detected, the processing is advanced to step S310. The S2 operation is a release-button full-depression operation (full depression of the release button).

At step S309, the camera-system control circuit 5 controls the shutter mechanism 16 to cause the shutter curtain to run and the image sensor 6 to capture an image of the object and so on. After step S309, the camera-system control circuit 5 returns the processing to S302.

If the processing goes to step S310, the camera-system control circuit 5 determines whether the S1 operation is kept. If the camera-system control circuit 5 determines that the S1 operation is kept, the processing is returned to step S308. If the camera-system control circuit 5 determines that the S1 operation is not kept, the processing is returned to step S302.

When a fixed time passes after a pressing operation on the release button by the user is cancelled so that the S1 operation is cancelled, the camera-system control circuit 5 turns off the image stabilization control (not illustrated in FIG. 3).

In the present embodiment, degraded components generated in the captured image due to the influence of aberration and diffraction caused by the image stabilization processing, described above, and correction processing for correcting the degraded components will be described in outline. The methods for the image stabilization processing and correction processing described here are used in the image capturing apparatus 1 of the present embodiment as appropriate.

The imaging optical system 3 of the image capturing apparatus 1 according to the present embodiment is designed to accurately correct spherical aberration, coma, field curvature, and astigmatism. However, for example, the image stabilization processing may cause a change in the aberration to degrade the captured image. For example, when the image stabilizing lens group is moved in a direction perpendicular to the optical axis 4 of the imaging optical system 3 by lens stabilization, the aberration may change due to the eccentricity of the optical axis 4 generated between the imaging optical system 3 and the image stabilizing lens group to degrade the captured image. The values of the aberration and so on vary depending on the image height (image position). Therefore, when the image height changes with the movement of the image sensor 6 due to imager stabilization, the values of the aberration and so on adapted to the changed height also change.

Lens aberration changes depending on the aperture diameter and so on, of which lateral aberration is generally decreased as the aperture diameter decreases. The diffraction phenomenon occurs less frequently as the aperture diameter is larger, for example, f/2.8, and occurs more frequently as the aperture diameter is smaller, for example, f/11 or f/22. Like the aberration, this diffraction phenomenon may also be a factor that degrades the captured image.

The aberration and diffraction can be described using a point spread function (hereinafter referred to as PSF) or an optical transfer function (hereinafter referred to as OTF). The mage degraded components due to aberration or diffraction is generated because light generated from one point of the object, which is to be focused on one point on an imaging plane without aberration and the influence of diffraction, spreads on the imaging plane, and therefore can be expressed using the PSF. The OTF obtained by Fourier transforming the PSF is frequency component information on the aberration and is represented by a complex number. The absolute value of the OTF, that is, an amplitude component, is referred to as a modulation transfer function (MTF), and the phase component is referred to as a phase transfer function (PTF). The MTF (amplitude component) and the PTF (phase component) are respectively the frequency responses of the amplitude component and the phase component of image degradation due to aberration. The phase component is expressed as a phase angle by Eq. (1).

$$PTF = \tan^{-1}(\text{Im}(OTF)/\text{Re}(OTF)) \qquad \text{Eq. (1)}$$

where Re(OTF) is the real part of OTF and Im(OTF) is the imaginary part of OTF.

The degradation of the captured image due to aberration and diffraction can be corrected by correcting the degraded component of the MTF (amplitude component) and the PTF (phase component). An example of a method for correcting the degraded components of the MTF (amplitude component) and the PTF (phase component) is a method of correction based on the information on the OTF or the PSF of the imaging optical system. In the present embodiment, the correction processing for correcting the degradation of the captured image based on the OTF or PSF information of the imaging optical system 3 is image restoration processing. One method for image restoration processing is convolution of a function having the inverse characteristic of the OTF to the input image (captured image). The function having the inverse characteristic of the OTF represents a correction filter for correcting image degradation (that is, an image restoration filter in the image restoration processing).

The image restoration processing, which is correction processing on the degraded components of the captured image, and the correction filter (the image restoration filter) for use in the image restoration processing will be described. In the case of the image capturing apparatus 1 of the present embodiment, the image restoration processing is performed by the image processing circuit 7.

In the present embodiment, the input image for the image restoration processing is a captured image that the image sensor 6 captured via the imaging optical system 3, and the output image is an image after the image restoration processing. The captured image (input image) is degraded because of the OTF due to the aberrations of the lenses and various optical filters (not illustrated) in the imaging optical system 3 and the OTF because of diffraction due to the diaphragm and the optical members (not illustrated) in the imaging optical system 3. In the following description, the degraded captured image (input image) is expressed as "degraded image". The imaging optical system may include not only the lenses but also a mirror (reflecting surface) having a curvature. An example of the input image is a RAW image having RGB color component information, but the input image is not limited to the RAW image. The input image and the output image may be given shooting conditions, such as whether an optical member is present, the lens focal length, the f number, the object distance, and various pieces of correction information for correcting the images.

First, the outline of the image restoration processing will be described.

The following Eq. (2) holds.

$$g(x,y)=h(x,y)*f(x,y) \quad \text{Eq. (2)}$$

where g(x, y) is a degraded image (captured image), f(x, y) is an original image, and h(x, y) is a point spread function (PSF), which is a Fourier pair of the optical transfer function (OTF). In Eq. (2), * is a convolution (convolution integral, the sum of products), and (x, y) is the coordinates on the captured image.

Fourier transforming Eq. (2) to a frequency display form gives Eq. (3) expressed by the product for each frequency.

$$G(u,v)=H(u,v) \cdot F(u,v) \quad \text{Eq. (3)}$$

where H is an optical transfer function (OTF) obtained by Fourier transforming the point spread function (PSF) (h), G is a function obtained by Fourier transforming the degraded image g, F is a function obtained by Fourier transforming the original image f, and (u, v) is the coordinates on a two-dimensional frequency plane, that is, the frequency.

To obtain the original image f from the captured degraded image g, both sides are divided by the optical transfer function H, as in Eq. (4).

$$G(u,v)/H(u,v)=F(u,v) \quad \text{Eq. (4)}$$

Inversely Fourier transforming F(u, v), that is, G(u, v)/H (u, v), gives the original image f(x, y) as a restored image.

Convolution operation on the image on an actual plane, as in Eq. (5), gives the original image f(x, y).

$$g(x,y)*R(x,y)=f(x,y) \quad \text{Eq. (5)}$$

where R is an inverse Fourier transform of $H^{-1}$.

R(x, y) in Eq. (5) represents an image restoration filter. In the case of a two-dimensional image, the image restoration filter R generally has taps (cells) corresponding to the individual pixels and has a distribution of two-dimensional filter values. The restoration accuracy is generally improved as the number of taps (cells) of the image restoration filter R increases. For that reason, a feasible number of taps is set according to the required image quality, the image processing capability, the spreading width of the point spread function (PSF), and the aberration properties. The image restoration filter R differs from general edge enhancement filters with about three taps in the horizontal and vertical directions (high pass filters) because the image restoration filter R needs to reflect at least the characteristics of the aberration and diffraction. Since the image restoration filter R is set on the basis of the optical transfer function (OTF), both of the degradation of the amplitude component and the phase component can be accurately corrected.

Since the actual image includes a noise component, the use of the image restoration filter R created by taking the inverse of the OTF, as described above, significantly amplifies the noise component with the restoration of the degraded image. This is because, if the MTF (amplitude component) of the optical system is normalized to 1 for the state in which the amplitude of the noise is added to the amplitude component of the image, the MTF is raised so as to return to 1 for all the frequencies. The MTF, which is degraded in amplitude by the optical system, returns to 1, but the power spectrum of the noise is also raised, resulting in amplification of the noise according to the degree of raising the MTF (restoration gain).

Therefore, when the image contains a noise, a high-quality image that can be used for viewing cannot be obtained. This is expressed as Eq. (6-1) and Eq. (6-2).

$$G(u,v)=H(u,v) \cdot F(u,v)+N(u,v) \quad \text{Eq. (6-1)}$$

$$G(u,v)/H(u,v)=F(u,v)+N(u,v)/H(u,v) \quad \text{Eq. (6-2)}$$

where N is the noise component.

For an image containing a noise component, there is a method for controlling the degree of restoration according to the intensity ratio of the image signal to the noise signal (SNR), like Wiener filtering, expressed by Eq. (7).

$$M(u, v) = \frac{1}{H(u, v)} \frac{|H(u, v)|^2}{|H(u, v)|^2 + SNR^2} \quad \text{Eq. (7)}$$

In Eq. (7), M(u, v) is the frequency response of the Wiener filter, and IH(u, v) is the absolute value of the optical transfer function (OTF) (the absolute value of the MTF). In the present embodiment, M(u, v) corresponds to the frequency response of the image restoration filter. In this method, the restoration gain (the degree of restoration) is decreased as the MTF decreases, and the restoration gain is increased as the MTF increases for each frequency. Since the MTF of the imaging optical system is generally high at a low frequency and low at a high frequency, this method substantially decreases the restoration gain of the image at a high frequency.

The gain characteristics of the image restoration filter change depending on the term of SNR in Eq. (7). For that reason, the term of SNR is used as a parameter C in Eq. (8) for simply controlling the restoration gain (the degree of restoration).

$$M(u, v) = \frac{1}{H(u, v)} \frac{|H(u, v)|^2}{|H(u, v)|^2 + C} \quad \text{Eq. (8)}$$

In Eq. (8), if the parameter C=0, M(u, v) is equal to the inverse filter of the optical transfer function (OTF) (the reciprocal of the MTF), and the gain of the image restoration filter decreases as the parameter C is increased. When the parameter C becomes greater than $|H(u, v)|-|H(u, v)|^2$ $(C>|H(u, v)|-|H(u, v)|^2)$, the gain of the image restoration filter becomes one time or less.

Figure 4A:
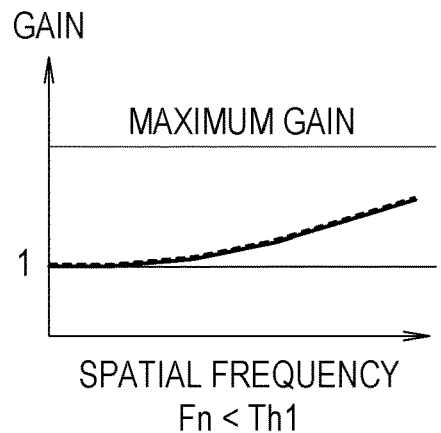
FIGS. 4A, 4B, and 4C are graphs illustrating the relationship between the gain characteristic of the inverse filter of an optical transfer function (OTF) and the gain characteristic of an image restoration filter.
Figure 4B:
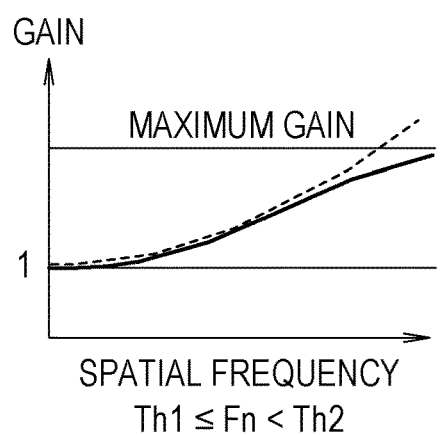
Figure 4C:
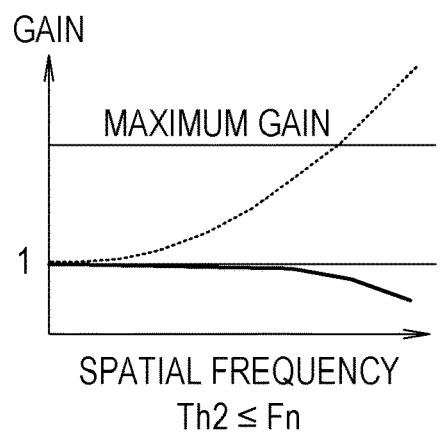

This is schematically illustrated in FIGS. 4A to 4C. FIGS. 4A to 4C are graphs illustrating the relationship between the gain characteristic of the inverse filter of the OTF and the gain characteristic of the image restoration filter. In FIGS. 4A to 4C, the vertical axis represents the gain, and the horizontal axis represents the spatial frequency. In FIGS. 4A to 4C, the dotted lines represent the gain characteristic of the inverse filter of the OTF, and the solid lines represent the gain characteristic of the image restoration filter.

If the f number Fn is less than a predetermined value Th1 (Fn<Th1), the gain of the image restoration filter does not become larger than a predetermined maximum gain, so that the parameter C can take the value 0. Therefore, the reciprocal of the MTF (the gain of the inverse filter of the OTF) and the gain of the image restoration filter agree with each other. 4A). If the f number Fn is greater than or equal to the predetermined value Th1 and less than a predetermined value Th2 (Th1≤Fn<Th2), the gain on the high frequency side of the inverse filter becomes larger than the predetermined maximum gain. For that reason, the parameter C is set to a greater value to suppress the gain at the high frequency side of the image restoration filter (FIG. 4B). If the f number Fn is greater than or equal to Th2 (Th2≤Fn), and $C>|H(u, v)|-|H(u, v)|^2$, the gain of the image restoration filter becomes less than or equal to one time (FIG. 4C). The predetermined values Th1 and Th2 (f numbers) are determined depending on the pixel pitch of the image sensor 6, the characteristics of the optical low-pass filter, the maximum value of the restoration gain (the degree of restoration) of the image restoration filter, and the parameter C for use in controlling the restoration gain.

Thus, the gain characteristic (the tendency) of the image restoration filter greatly changes with the f number. In the present embodiment, the data amount of the image restoration filter to be used in image restoration processing by the image capturing apparatus 1 can be reduced by the following computation in consideration of the above tendency.

Figure 5:
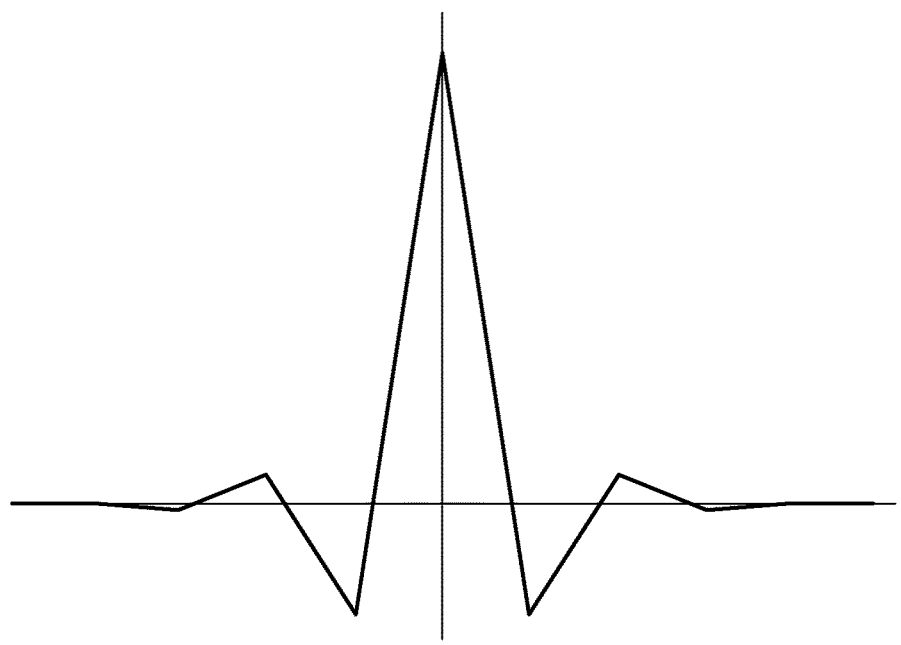
FIG. 5 is a diagram illustrating the characteristics of the image restoration filter.

Referring next to FIG. 5, the image restoration filter used in the present embodiment will be described.

FIG. 5 is a diagram illustrating the characteristics of the image restoration filter. The number of taps of the image restoration filter is determined depending on the spread of the point spread function (PSF) due to the aberration and diffraction of the imaging optical system 3 and the restoration accuracy required for the image restoration processing. In the present embodiment, the image restoration filter is, for example, a two-dimensional filter with 11-by-11 taps. However, this is given for mere illustrative purposes. An image restoration filter with more taps may be used in view of the relationship between the spread width of the PSF and the pixel pitch. The distribution of the values of the taps (coefficient values) of the image restoration filter has the function of returning the spatially spread signal values or pixel values due to the aberration to, ideally, the original one point. For diffraction due to the aperture, which can be approximated to rotational symmetry, the PSF due to the diffraction is rotationally symmetric. Therefore, the characteristics of the image restoration filter is symmetric as in FIG. 5.

In the present embodiment, in each tap of the image restoration filter, convolution processing (convolution integral, summing of products) is performed in the process of image restoration processing for each pixel of the image. In the convolution processing, to improve the signal value of a predetermined pixel, the pixel is set at the center of the image restoration filter, the product of the signal value of the image and the value of each tap is calculated for each corresponding pixel of the image restoration filter, and the sum of the products is substituted as the signal value of the central pixel.

Referring next to FIGS. 6A and 6B and FIGS. 7A and 7B, the characteristics of the image restoration processing in the actual space and the frequency space will be described.

Figure 6A:
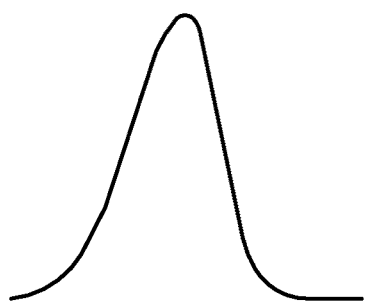
FIGS. 6A and 6B are explanatory diagrams of a point spread function (PSF).
Figure 6B:
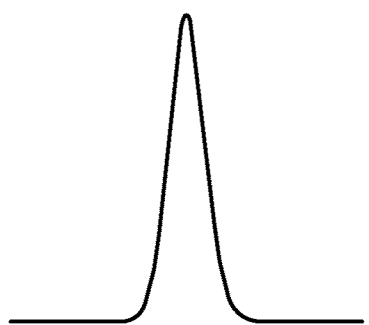
Figure 7A:
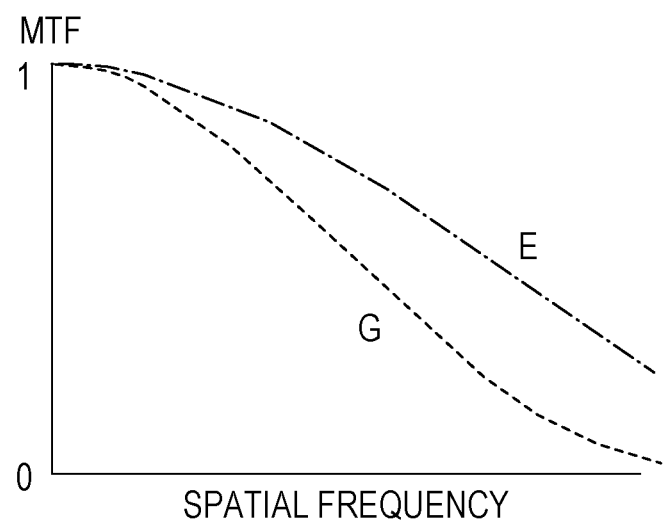
FIG. 7A is an explanatory diagram of the amplitude component (MTF) of the optical transfer function.
Figure 7B:
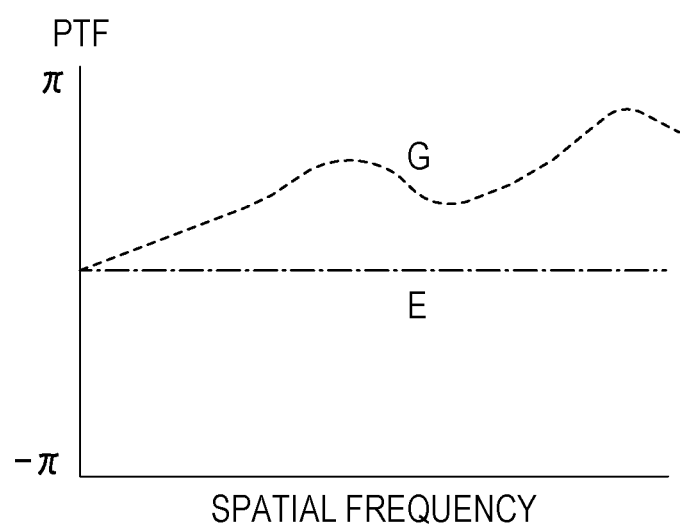
FIG. 7B is an explanatory diagram of the phase component (PTF) of the OTF.

FIGS. 6A and 6B are explanatory diagrams of the point spread function (PSF). FIG. 6A illustrates a PSF before image restoration, and FIG. 6B illustrates the PSF after image restoration. FIG. 7A is an explanatory diagram of the amplitude component (MTF) of the optical transfer function (OTF), and FIG. 7B is an explanatory diagram of the phase component (PTF) of the OTF. In FIG. 7A, the broken line G represents an MTF before image restoration, and the dashed chain line E represents the MTF after image restoration. In FIG. 7B, the broken line G represents a PTF before image restoration, and the dashed chain line E represents the PTF after image restoration.

As illustrated in FIG. 6A, the PSF before image restoration has an asymmetric distribution due to the aberration. The PTF has nonlinear values with respect to the frequency because of the asymmetric characteristic. In the image restoration processing, since the image is corrected so that the MTF is amplified and the PTF becomes zero, the PSF after image restoration has a symmetric, sharp shape.

For diffraction due to the aperture, which can be approximated to rotational symmetry, the PSF due to the diffraction is rotationally symmetric. Accordingly, the dashed chain line E in FIG. 7B takes the value 0. In other words, the diffraction in the present embodiment has no phase shift. Since the principle of the image restoration, described above, functions regardless of whether a phase shift has occurred, the image restoration is effective also in the present embodiment in which diffraction is to be corrected.

Thus, the image restoration filter can be obtained by Fourier transforming a function designed on the basis of the inverse function of the optical transfer function (OTF) of the imaging optical system 3. The image restoration filter used in the present embodiment can be changed as appropriate. For example, the Wiener filter described above can be used. The use of the Wiener filter allows an image restoration filter in the actual space which is convolved in the image to be created by inversely Fourier transforming Eq. (7).

The OTF changes according to the image height (the position of the image) of the imaging optical system 3 in one shooting state (shooting condition). For that reason, the image restoration filter is changed and used according to the image height. In contrast, an OTF on which the influence of diffraction becomes dominant as the f number increases can be dealt as an OTF that is constant with respect to the image height if the vignetting of the optical system is small.

In the present embodiment, diffraction (a diffraction blur) is also to be corrected. If the f number is small, the image restoration filter depends on the f number, the wavelength of light, and the image height (image position). For that reason, a uniform (constant) image restoration filter cannot be used in one image. In other words, the image restoration filter of the present embodiment is created by computation using an optical transfer function including a diffraction blur generated according to the f number. A method for computing the image restoration filter will be described later. For wavelengths, optical transfer functions at a plurality of wavelengths are calculated, and an optical transfer function for each color component is created by assigning a weight for each wavelength on the basis of the supposed spectral characteristic of the light source and the light-receiving sensitivity information on the image sensor. In some embodiments, a predetermined representative wavelength of each color component is used for the calculation, and the image restoration filter is created on the basis of the optical transfer function for each color component.

In image restoration processing, the image processing circuit 7 first obtains shooting condition information, described above, from the camera-system control circuit 5. The image processing circuit 7 selects one or more image restoration filters for each of an axial light flux and an off-axis light flux according to the f number in shooting from the shooting condition information. The image processing circuit 7 creates a restored image (output image) from the captured image (input image) using the selected image restoration filter.

The restored image created by the image processing circuit 7 is stored in the memory circuit 8 in a predetermined format. The display unit 9 displays an image obtained by performing a predetermined process on the image processed by the image processing circuit 7. The display unit 9 may display an image subjected to a simple process for high-speed display.

If an optical element that has an influence on the characteristics of the OTF is provided in addition to the lens unit 2, the influence may be considered in creating the image restoration filter. An example is the influence of an optical low-pass filter disposed in front of the image sensor 6. In this case, the image processing circuit 7 creates the image restoration filter on the basis of an optical transfer function due to the optical low-pass filter. If an infrared cut filter is disposed in the photographing optical path, the infrared cut filter has an influence on the point spread functions (PSFs) of the RGB channels, which are the integral values of the PSFs of the spectral wavelengths, in particular, the PSF of the R channel. Therefore, the influence is considered in creating the image restoration filter. In this case, the image processing circuit 7 creates the image restoration filter on the basis of the optical transfer function due the infrared cut filter. The shape of the pixel opening also exerts an influence on the optical transfer function, and the influence is taken into consideration. In this case, the image processing circuit 7 creates the image restoration filter on the basis of the optical transfer function based on the pixel opening.

Next, the image restoration processing performed by the image processing circuit 7 under the control of the camera-system control circuit 5 will be described.

For effective image restoration processing, accurate OTF or PSF information on the imaging optical system 3 is required. The OTF or PSF information can be calculated from, for example, setting information designed for the imaging optical system 3, if present. The PSF or OTF information can also be obtained from a light intensity distribution obtained when a point light source is photographed or by Fourier transforming the intensity distribution. For diffraction, the OTF or PSF information can be obtained using a theoretically derived formula.

When an image blur is reduced by image stabilization processing, the aberration and so on of the imaging optical system change. For that reason, image degradation due to the changes in aberration and so on needs to be corrected in the image restoration processing. Thus, when image restoration processing is performed to correct the image degradation due to the changes in the aberration and so on of the imaging optical system due to the image stabilization processing, an enormous amount of OTF or PSF information may be needed to determine an image restoration filter.

For example, in image stabilization processing using lens stabilization, the aberration generated in an optical image on the imaging plane of the image sensor 6 differs between in an eccentric state in which the optical axis 4 of the imaging optical system 3 becomes eccentric because the image stabilizing lens group is moved to a direction perpendicular to the optical axis 4 and in a non-eccentric state in which the optical axis 4 is not eccentric. For that reason, for desired image restoration processing, OTF or PSF information in the eccentric state has to be stored in addition to OTF or PSF information in the non-eccentric state.

In image stabilization processing using imager stabilization, the image sensor 6 is shifted, tilted, and rolled with respect to the optical axis of the imaging optical system 3. For that reason, the image circle of the imaging optical system 3 suited to imager stabilization is set considerably larger than the image circle of an imaging optical system that is not suited to imager stabilization. In the imager stabilization, the size of the image circle of the imaging optical system 3 is regarded as a guide for determining the range of image stabilization with respect to the actual shooting range (that is, an image field). To achieve image restoration processing suited to a large image circle in the imager stabilization, it is necessary to prepare OTF or PSF information suited to the maximum value of the image height of the image circle. Thus, preparing information suited to the maximum image height of the image circle based on the maximum moving amount at imager stabilization allows appropriate image restoration processing even if the image sensor 6 is moved to a maximum extent at imager stabilization for image stabilization processing. However, this increases the data amount of OTF or PSF information corresponding to the large image circle suited to the maximum moving amount at imager stabilization.

For example, for simultaneous use of two or more types of image stabilization processing, much more OTF or PSF information will be needed to determine an image restoration filter for use in image restoration processing. Specifically, OTF or PSF information suited to each of a non-image-stabilization processing state (a non-eccentric state), lens stabilization (an eccentric state), imager stabilization, and simultaneous use of lens stabilization and imager stabilization is needed. For the simultaneous use of lens stabilization and imager stabilization, OTF or PSF information for an image height higher than an image height for a case in which only imager stabilization is performed is needed to support the eccentric state due to lens stabilization. In other words, the simultaneous use of two or more types of image stabilization processing requires a massive amount of OTF or PSF information to be stored in advance. This requires a mass storage medium for storing such a massive amount of OTF or PSF information, and for image restoration processing, the OTF or PSF information is transferred from the storage medium to the image processing circuit 7. In this case, the time required for the transfer increases as the amount of data of the information increases, resulting in an increase in the processing time of the entire system, causing a decrease in system efficiency.

Therefore, the image capturing apparatus 1 of the present embodiment selects information necessary for the image restoration processing from all OTF or PSF information related to lens stabilization and imager stabilization according to image stabilization processing used in shooting and transfers the selected information to the image processing circuit 7.

In the above description, the information for use in obtaining an image restoration filter for use in image restoration processing is OTF or PSF information. Alternatively, any information that indicates an optical transfer function, such as wavefront, MTF, or PTF, may be used. Hereinafter, the information on an optical transfer function for use in obtaining an image restoration filter is referred to as filter information. In the image capturing apparatus 1 of the present embodiment, the filter information is stored in the memory circuit 8. For example, information for lens stabilization may be stored in a memory (not illustrated) of the lens unit 2 and may be sent to the memory circuit 8 for storage when the lens unit 2 is attached to the image capturing apparatus 1.

Figure 8:
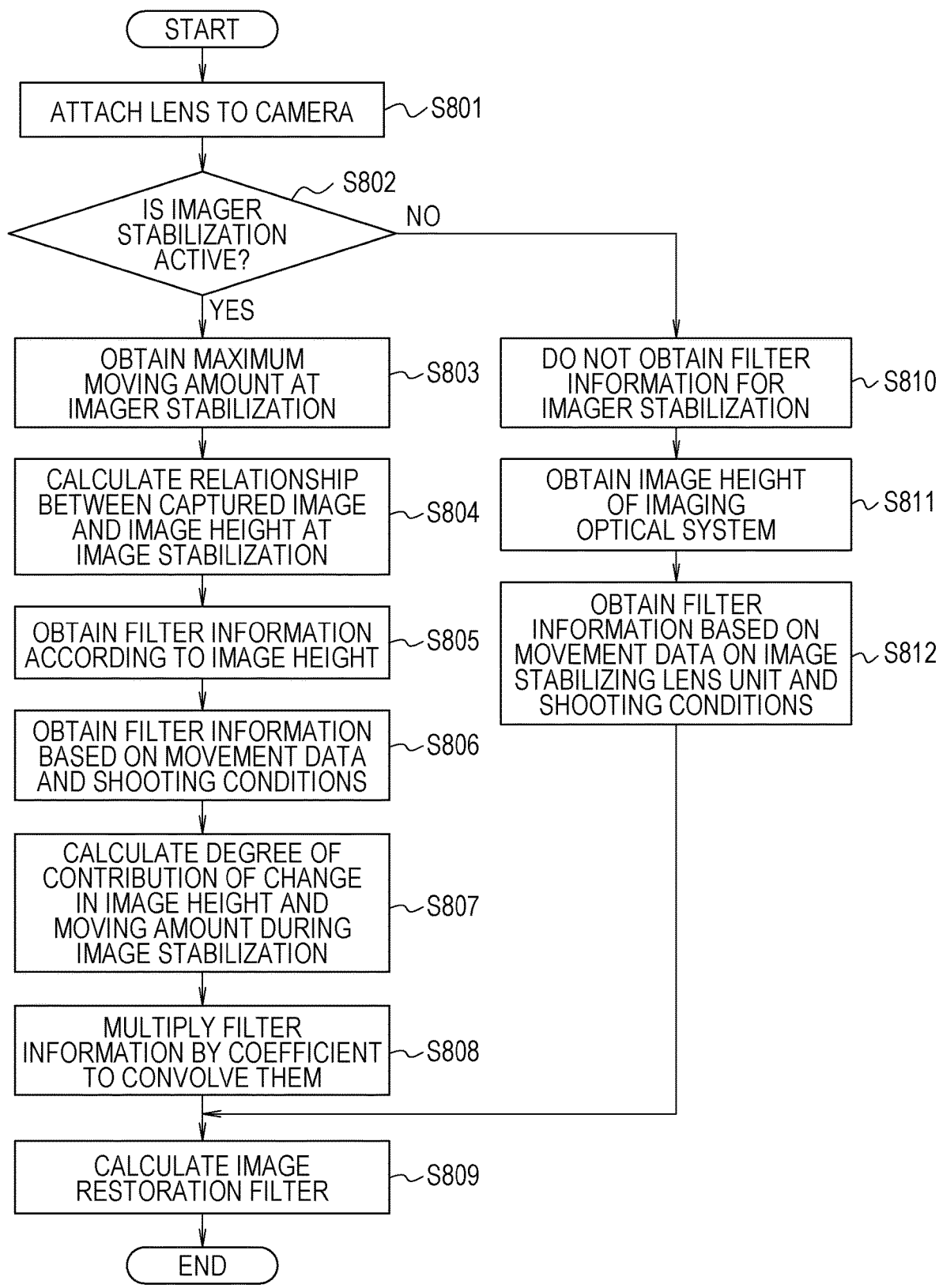
FIG. 8 is a flowchart illustrating a processing procedure for creating an image restoration filter.

FIG. 8 is a flowchart illustrating the procedure of the image restoration processing performed by the image capturing apparatus 1 of the present disclosure.

The flowchart in FIG. 8 illustrates a processing procedure for the image restoration processing in which lens stabilization is executed but, for the imager stabilization, the processing is separated into a case in which the imager stabilization is performed and a case in which the imager stabilization is not performed. This image restoration processing may be performed immediately after shooting or at the playback of the recorded image. The processing of the flowchart illustrated in FIG. 8 is mainly executed by the camera-system control circuit 5 and the image processing circuit 7. The image processing circuit 7 performs the processes of the steps described below based on instructions from the camera-system control circuit 5. The following description uses an example in which the camera-system control circuit 5 obtains the filter information stored in the memory circuit 8 and transfers the filter information to the image processing circuit 7. Alternatively, the image processing circuit 7 may obtain the filter information directly from the memory circuit 8.

When at step S801 the lens unit 2 is attached to the image capturing apparatus 1, the camera-system control circuit 5 advances the processing to step S802.

At step S802, the camera-system control circuit 5 determines whether the function of imager stabilization is active (ON) in the image capturing apparatus 1. If the camera-system control circuit 5 determines that the imager stabilization function is active (ON) (YES), the processing goes to step S803. In contrast, if the camera-system control circuit 5 determines that the imager stabilization function is inactive (OFF) (NO), the processing proceeds to step S810. The camera-system control circuit 5 may advances the processing to step S803 when the image capturing apparatus 1 has the imager stabilization function and may advances the processing to step S810 when the image capturing apparatus 1 has no imager stabilization function.

At step S803, the camera-system control circuit 5 reads information on the maximum moving amount of the image sensor 6 for imager stabilization from, for example, the memory circuit 8. The maximum moving amount of the image sensor 6 for imager stabilization includes the maximum shift amount, the maximum roll amount, and the maximum tilt amount of the image sensor 6. The camera-system control circuit 5 obtains these pieces of information. The information on the maximum moving amount is used in calculating the coordinates of the image height when image stabilization processing using imager stabilization is performed later.

Next at step S804, the image processing circuit 7 calculates the relationship between an image captured through imager stabilization based on the maximum moving amount and the image height of the imaging optical system 3 of the lens unit 2. Thus, the image processing circuit 7 obtains the amount of change in image height due to the movement of the image sensor 6 caused by imager stabilization.

Next at step S805, the camera-system control circuit 5 obtains filter information for use for an image restoration filter suited to the image height calculated at step S804 from the memory circuit 8 and transfers the filter information to the image processing circuit 7.

Next at step S806, the camera-system control circuit 5 obtains movement data when the image stabilizing lens group is moved for lens stabilization and also information on the shooting conditions of the image capturing apparatus 1 and sends the movement data and the information to the image processing circuit 7. At step S806, the image processing circuit 7 calculates the amount and the direction of the eccentricity of the image stabilizing lens group with respect to the optical axis 4 of the imaging optical system 3 from the movement data on the image stabilizing lens group. The camera-system control circuit 5 obtains desired filter information from the filter information stored in the memory circuit 8 based on the amount and the direction of eccentricity calculated by the image processing circuit 7 and the shooting conditions and transfers the desired filter information to the image processing circuit 7.

Next at step S807, the image processing circuit 7 calculates the degree of contribution of each of the correction amount (the amount of change in image height) at imager stabilization and the amount and direction of eccentricity at lens stabilization to the amount of movement from the optical axis 4. The image processing circuit 7 may calculate the degree of contribution of each of the amount and direction of the movement of the image sensor 6 at imager stabilization and the amount and direction of the movement of the image stabilizing lens group at lens stabilization to the amount of change in the PSF before and after the movement. The degrees of contribution calculated at step S807 are used as coefficients in convolution of a plurality of pieces of PSF information.

A method for calculating the degrees of contribution will be described.

The amount of change in point spread function (PSF) is assumed as the amount of change in optical transfer function (MTF). The MTF changes when the image height changes due to imager stabilization. The amount of change in MTF at that time is referred to as a first change amount of the MTF. The MTF changes when eccentricity occurs due to lens stabilization. The amount of change in MTF at that time is referred to as a second change amount of the MTF. The degree of contribution is obtained from the ratio of the amount of change in the first MTF to the amount of change in the second MTF.

For example, if the original MTF has a value of 60%, and a change in image height changes the value of the MTF at the same evaluation image height to 50%, the first change amount of the MTF is 10 (=60-50). If the original MTF has a value of 60%, and the movement of the image stabilizing lens group changes the value of the MTF at the same evaluation image height to 40%, the second change amount of the MTF is 20 (=60-40). In this case, the PSF at imager stabilization and the PSF at lens stabilization make a contribution with a ratio of 1:2.

The direction of eccentricity at lens stabilization will be described. The MTF is improved or deteriorated depending on the direction of the eccentricity of the image stabilizing lens group. In many cases, the direction of the eccentricity of the image stabilizing lens group in which the MTF is improved, and the direction of the eccentricity of the image stabilizing lens in which the MTF is deteriorated are point-symmetrical about the optical axis 4. In this case, the degree of contribution of the PSF is changed so that a large correction is made in the direction in which the MTF is deteriorated, and a small correction is made in the direction in which the MTF is improved. However, if the MTF becomes lower than the original MTF in any direction after the image stabilizing lens group becomes eccentric, a correction is made to either image height.

For example, if the original MTF has a value of 60%, and the eccentricity of the image stabilizing lens group improves the value of the MTF to 70%, the second change amount of the MTF is −10 (=60-70). If the original MTF has a value of 60%, and the eccentricity of the image stabilizing lens group deteriorates the value of the MTF to 50%, the second change amount of the MTF is 10 (=60-50). Since the degree of contribution is proportional to the ratio, the PSF at lens stabilization when the value of the MTF is improved makes a contribution at a ratio at which the gain comes downs to 10/60, and the PSF at lens stabilization when the value of the MTF is deteriorated makes a contribution at a ratio at which the gain comes up to 10/60.

Next at step S808, the image processing circuit 7 calculates a PSF at a certain image height on the basis of the PSF (the filter information) selected as described above. Specifically, the image processing circuit 7 multiplies the PSF selected according to the image height shifted by imager stabilization and the PSF selected according to the imaging optical system 3 that becomes eccentric by the movement of the image stabilizing lens group at lens stabilization by a coefficient to convolve them, calculating the PSF at the image height.

Next at step S809, the image processing circuit 7 creates an image restoration filter. Specifically, the image processing circuit 7 Fourier transforms the PSF calculated at step S808 to obtain an OTF and calculates an image restoration filter, which is a function obtained by inversely Fourier transforming the OTF.

If at step S802 it is determined that imager stabilization is inactive, and the processing goes to step S810, the camera-system control circuit 5 does not obtain filter information for use in imager stabilization and obtains only filter information for use in lens stabilization.

Next at step S811, the image processing circuit 7 obtains an image height using the imaging optical system 3 of the lens unit 2 at lens stabilization from the memory circuit 8 or by calculation.

Next at step S812, the camera-system control circuit 5 obtains movement data when the image stabilizing lens group is moved at lens stabilization and information on the shooting conditions of the image capturing apparatus 1 and sends the movement data and the information to the image processing circuit 7. At step S812, the image processing circuit 7 calculates the amount and the direction of eccentricity of the image stabilizing lens group with respect to the optical axis 4 of the imaging optical system 3 based on the movement data on the image stabilizing lens group. The camera-system control circuit 05 obtains desired filter information from the filter information stored in the memory circuit 8 based on the amount and the direction of eccentricity calculated by the image processing circuit 7 and the shooting conditions and transfers the desired filter information to the image processing circuit 7.

After step S812, the processing of the image capturing apparatus 1 proceeds to step S809, where the image processing circuit 7 calculates an image restoration filter as in the above.

In the example of FIG. 8, after lens stabilization is executed, the processing is separated depending on whether imager stabilization is to be executed. If only imager stabilization is executed without lens stabilization being executed, filter information for imager stabilization is transferred to the image processing circuit 7. In other words, the camera-system control circuit 5 calculates the relationship between an image captured through imager stabilization and the image height of the imaging optical system 3 at non-eccentric position based on the maximum moving amount of the image sensor 6 at imager stabilization. The camera-system control circuit 5 obtains filter information for use for an image restoration filter suited to the image height from the memory circuit 8 and transfers the filter information to the image processing circuit 7.

As described above, the image capturing apparatus 1 of the present embodiment selects filter information necessary for image stabilization processing used in image capturing from all pieces of filter information on lens stabilization and imager stabilization and transfers the selected filter information to the image processing circuit 7. This allows the image capturing apparatus 1 of the present embodiment to reduce the amount of information to be transferred to reduce the transfer load while achieving high-accuracy image stabilization processing and to reduce the time required to transfer the image, providing system efficiency.

The image processing apparatus of the present embodiment is applicable not only to digital cameras but also to industrial cameras, in-vehicle cameras, medical cameras, surveillance cameras, and smartphones and tablet terminals with a camera function.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the scope of the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-048344, filed Mar. 15, 2019, which is hereby incorporated by reference herein in its entirety.

What is claimed is:

1. An image processing apparatus comprising:
   at least one processor and/or at least one circuit which functions as:
   a control unit configured to select filter information from a plurality of pieces of filter information for correcting degradation according to a point spread function stored in a storage medium and to perform a predetermined operation based on the selected filter information to create a correction filter; and
   a correction unit configured to correct a captured image using the created correction filter,
   wherein, when first image stabilization processing of moving an image sensor with respect to an optical axis of an imaging optical system is used in image capturing, the control unit selects filter information suited to an image height based on a moving amount of the image sensor at the first image stabilization processing, from the plurality of pieces of filter information stored in the storage medium.

2. The image processing apparatus according to claim 1, wherein, when the first image stabilization processing is used in image capturing, the control unit selects filter information suited to an image height based on a maximum moving amount of the image sensor at the first image stabilization processing.

3. The image processing apparatus according to claim 1, wherein, when the first image stabilization processing and second image stabilization processing of making at least a part of the imaging optical system eccentric are used in image capturing, the control unit selects a plurality of pieces of filter information related to the first image stabilization processing and the second image stabilization processing from the plurality of pieces of filter information stored in the storage medium.

4. The image processing apparatus according to claim 3, wherein, when the first image stabilization processing and the second image stabilization processing of making at least a part of the imaging optical system eccentric are used in image capturing, the control unit selects filter information related to the first image stabilization processing and the second image stabilization processing based on the moving amount of the image sensor at the first image stabilization processing and an amount of eccentricity of the at least a part of the imaging optical system at the second image stabilization processing.

5. The image processing apparatus according to claim 1, wherein the filter information includes a point spread function in a state in which at least a part of an imaging optical system is eccentric.

6. The image processing apparatus according to claim 1, wherein the filter information includes a point spread function of an image circle formed by an imaging optical system in a state in which at least a part of the imaging optical system is not eccentric.

7. The image processing apparatus according to claim 1, further comprising an image sensor configured to obtain the captured image.

8. A method for image processing comprising:
   selecting filter information from a plurality of pieces of filter information for correcting degradation according to a point spread function stored in a storage medium;
   performing a predetermined operation based on the selected filter information to create a correction filter;
   correcting a captured image using the created correction filter; and
   when first image stabilization processing of moving an image sensor with respect to an optical axis of an imaging optical system is used in image capturing, selecting filter information suited to an image height based on a moving amount of the image sensor at the first image stabilization processing, from the plurality of pieces of filter information stored in the storage medium.

9. A non-transitory computer-readable storage medium storing instructions which, when executed by a computer, cause the computer to execute operations comprising:
   selecting filter information from a plurality of pieces of filter information for correcting degradation according to a point spread function stored in a storage medium;
   performing a predetermined operation based on the selected filter information to create a correction filter;
   correcting a captured image using the created correction filter; and
   when first image stabilization processing of moving an image sensor with respect to an optical axis of an imaging optical system is used in image capturing, selecting filter information suited to an image height based on a moving amount of the image sensor at the first image stabilization processing, from the plurality of pieces of filter information stored in the storage medium.

* * * * *